Oct. 18, 1927. 1,646,046
C. B. WHITE
PROCESS OF REVIVIFYING FIRE EXTINGUISHING SOLUTIONS
Filed July 25, 1925
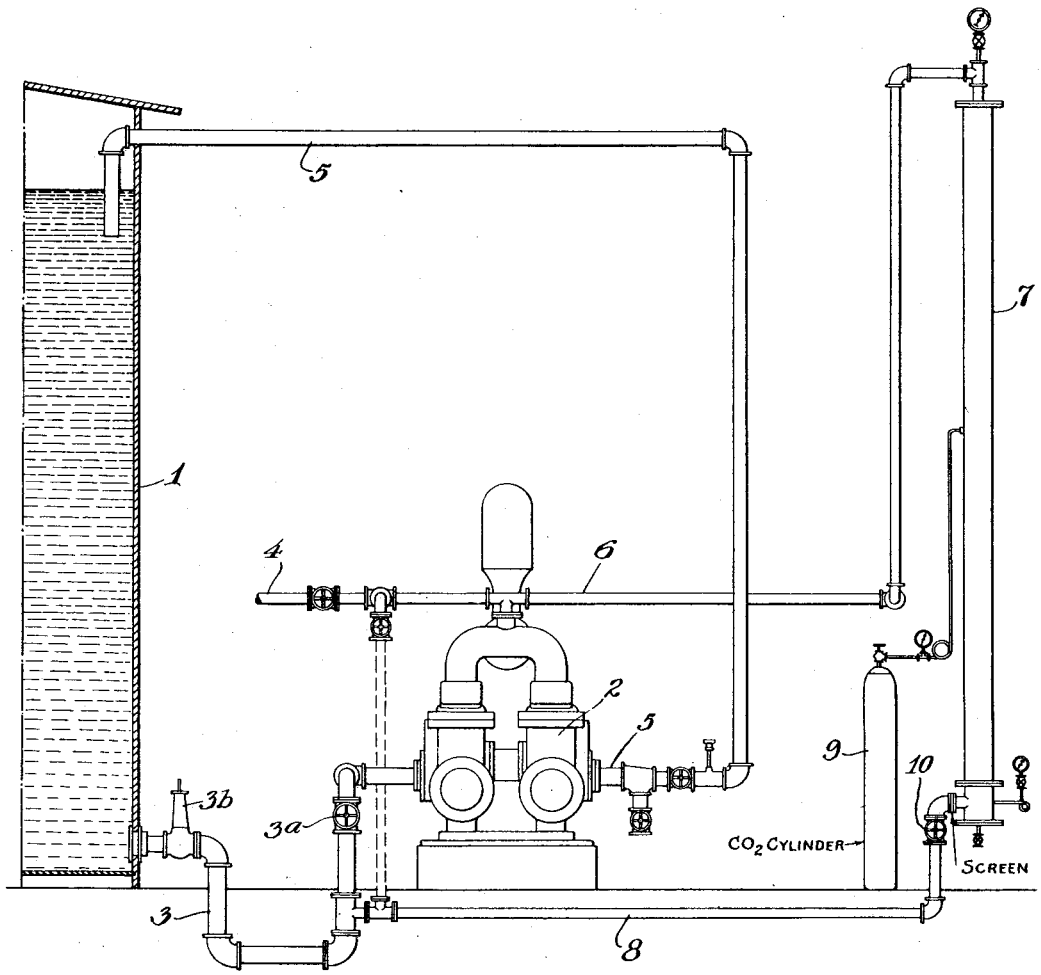
INVENTOR
Clifford B White
BY
Jeffrey Kimball Eggleston
ATTORNEY Patented Oct. 18, 1927.

1,646,046

UNITED STATES PATENT OFFICE.

CLIFFORD B. WHITE, OF UTICA, NEW YORK, ASSIGNOR TO FOAMITE-CHILDS CORPORATION, OF UTICA, NEW YORK, A CORPORATION OF DELAWARE.

PROCESS OF REVIVIFYING FIRE-EXTINGUISHING SOLUTIONS.

Application filed July 25, 1925. Serial No. 45,960.

The invention relates to the salvage of deteriorated solutions used in systems for producing foam for the extinguishment of fires. Such solutions are ordinarily stored in large tanks holding many thousands of gallons and, depending upon the frequency of fire emergencies, may remain stored for many months. The usual basic solution is a solution of bicarbonate of soda in water. In the course of time this solution is found to break down gradually into normal carbonate of soda, which is not an efficient basic solution for reaction with the acid solution, for the production of foam. When such conversion has progressed beyond a certain point it is customary to dispose of the solution and replace it with a fresh bicarbonate solution. This is an expensive procedure, especially as the basic solution ordinarily contains the foaming agent, secondary extract of licorice or the like, which is also wasted when the old solution is thrown away. The present invention provides for the re-vivification of the old solution in situ and saves the waste heretofore suffered; the revivification can itself be carried out at much less expense than substituting fresh solution and without interrupting the condition of operativeness of the system, that is to say, the deteriorated solution can be restored to usefulness without interfering with its availability for use in the event of fire, whereas, according to previous methods, the whole system was more or less incapacitated during the period of discharging the old solution and mixing and re-charging the fresh solution.

The invention consists essentially in connecting an absorber to the basic storage tank and circulating the basic solution through the absorber, while keeping the latter charged with $CO_2$, preferably under a few pounds pressure. $CO_2$ is taken up by the solution and the normal carbonate of soda therein is reconverted to bicarbonate form, the circulation through the absorber being continued until a complete, or at least a sufficient revivification is indicated by test. The presence of the foaming agent in the solution does not adversely affect the reconversion.

The accompanying drawing illustrates a typical arrangement of the apparatus used in this invention.

The reference 1 designates the storage tank containing the basic solution to be revivified and 2 represents the standard delivery pump by means of which the solutions are normally delivered to the point of mixing and foam production in the event of fire. On such occasions the pump draws the solution from the bottom of the tank through the suction pipe 3 and delivers it through the fire pipe 4 to the place of fire. This same pump is used for the present invention. The shut-off valve on the normal delivery pipe is closed and the pump suction valve $3^a$ is closed. The tank suction valve $3^b$ is left open, and the suction end of the pump is connected by the piping 5 to the top of the storage tank so that it can draw off the solution from the upper part of the latter. The outlet of the pump is connected by pipe 6 to the top of the absorber tower 7 and the bottom of the tower is connected by pipe 8 to the suction pipe 3. The operation of the pump thus produces a circulation of the B solution through the absorber tower. The latter is generally filled with brickbats or chemical earthenware and is connected at about its middle with a source of $CO_2$ gas represented in the present case by the carboy or cylinder 9. The outlet valve 10 from the absorber tower is partially closed or restricted so as to establish and maintain a pressure of about 50 pounds, more or less, in the absorber, and the $CO_2$ is of course admitted at a corresponding pressure until the carboy is exhausted, whereupon another is substituted and so on until test of the solution indicates the necessary extent of revivification when the circulating piping can be removed or shut off by valves from the normal apparatus.

During the revivifying process, which may consume several days, depending upon the amount of solution to be treated and gas to be absorbed, which is predetermined by chemical analysis, it will be apparent that the solution is available on an instant's notice for delivery to a point of fire by merely manipulating the appropriate valves. The revivified solution, after careful analysis and observation, is found to be quite as efficient for foam production as a fresh solution, no untoward effect being discernible upon the character of the foaming agent contained therein.

Having described my invention the following is claimed:

1. The process of revivifying basic solutions used in foam-type fire extinguishing systems, which consists in closing off the normal delivery connection between the solution tank and the fire pump, using said pump to circulate the solution through an absorber and maintaining the latter charged with $CO_2$.

2. The process of revivifying basic solutions used in foam-type fire extinguishing systems, which consists in utilizing the existing fire pump for drawing off the solution from the upper part of its storage tank, passing the same through an absorber kept charged with $CO_2$ and thence returning the solution to the lower part of said storage tank.

In testimony whereof, I have signed this specification.

CLIFFORD B. WHITE.